United States Patent [19]
Ito

[11] Patent Number: 6,033,137
[45] Date of Patent: *Mar. 7, 2000

[54] INK JET PRINTING APPARATUS PERFORMING PRINTING WITH CORRECTION OF IMAGE DATA AT BOUNDARY PORTION OF IMAGE

[75] Inventor: Yoshikuni Ito, Yokohama, Japan

[73] Assignee: Canon Kabushiki Kaisha, Tokyo, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 08/715,364

[22] Filed: Sep. 12, 1996

[30] Foreign Application Priority Data

Sep. 14, 1995 [JP] Japan .................................. 7-237022

[51] Int. Cl.[7] ........................................................ B41J 3/42
[52] U.S. Cl. ................................ 400/74; 347/19; 395/117
[58] Field of Search ................................. 400/74; 347/19; 395/117

[56] References Cited

U.S. PATENT DOCUMENTS

| | | | |
|---|---|---|---|
| 4,313,124 | 1/1982 | Hara ........................................ | 346/1.1 |
| 4,345,262 | 8/1982 | Shirato et al. ........................... | 346/1.1 |
| 4,459,600 | 7/1984 | Sato et al. ............................... | 346/140 R |
| 4,463,359 | 7/1984 | Ayata et al. .............................. | 346/1.1 |
| 4,558,333 | 12/1985 | Sugitani et al. ......................... | 346/140 R |
| 4,608,577 | 8/1986 | Hori ........................................ | 346/140 R |
| 4,723,129 | 2/1988 | Endo et al. .............................. | 346/1.1 |
| 4,740,796 | 4/1988 | Endo et al. .............................. | 346/1.1 |
| 5,343,231 | 8/1994 | Suzuki ..................................... | 347/19 |
| 5,353,052 | 10/1994 | Suzuki et al. ............................ | 347/19 |
| 5,455,608 | 10/1995 | Stewart et al. ........................... | 347/19 |
| 5,552,810 | 9/1996 | Matsuo .................................... | 347/19 |

FOREIGN PATENT DOCUMENTS

| | | | |
|---|---|---|---|
| 0 461 759 | 12/1991 | European Pat. Off. ................. | 347/19 |
| 0 461 810 | 12/1991 | European Pat. Off. ................. | 347/19 |
| 0 665 105 | 8/1995 | European Pat. Off. ................. | 347/19 |
| 54-056847 | 5/1979 | Japan . | |
| 59-123670 | 7/1984 | Japan . | |
| 59-138461 | 8/1984 | Japan . | |
| 60-071260 | 4/1985 | Japan . | |
| 2-286341 | 11/1990 | Japan ..................................... | 347/19 |
| 4-41245 | 2/1992 | Japan ..................................... | 347/19 |
| 6-047925 | 2/1994 | Japan ..................................... | 347/19 |

*Primary Examiner*—Eugene Eickholt
*Attorney, Agent, or Firm*—Fitzpatrick, Cella, Harper & Scinto

[57] ABSTRACT

When degree of a streak of density fluctuation is varied mainly due to variation of a printing medium to be used and/or variation of use environment of an apparatus to be impossible to correct the density fluctuation, a test pattern is first output with maintaining a second image correcting portion for correction inoperative. A correction coefficient of an image signal corresponding to ink ejection openings at end portions is then set depending upon density fluctuation $\Delta C_{SUM}$ on the ink ejection openings at the end portions obtained from the result of reading. By this, in an ink jet printing apparatus, the streak in a printed image can be constantly restricted irrespective of variation of the printing medium to be used and/or use environment of the apparatus.

34 Claims, 11 Drawing Sheets

| PROPERTY OF PRINTING MEDIUM | FIRST IMAGE CORRECTING PORTION (CORRECTION FOR STREAK DUE TO BLEEDING) | SECOND IMAGE CORRECTING PORTION (CORRECTION FOR STREAK DUE TO BEADING) |
|---|---|---|
| BLEEDING: LARGE<br>BEADING : LARGE | ON | ON |
| BLEEDING: LARGE<br>BEADING : SMALL | ON | OFF |
| BLEEDING: SMALL<br>BEADING : LARGE | OFF | ON |
| BLEEDING: SMALL<br>BEADING : SMALL | OFF | OFF |

*FIG.6*

INK JET PRINTING APPARATUS PERFORMING PRINTING WITH CORRECTION OF IMAGE DATA AT BOUNDARY PORTION OF IMAGE

BACKGROUND OF THE INVENTION

1. Field of the Invention

The present invention relates generally to an ink jet printing apparatus. More specifically, the invention relates to an ink jet printing apparatus which can reduce a streak or a banding which can be formed at a boundary between two scanned regions in a recorded image.

2. Description of the Related Art

An ink jet printing apparatus is popularizing rapidly in the recent years for various advantages, e.g., low noise as a non-impact type printing apparatus, ease of printing a color image by employing a plurality colors of inks, and so forth.

FIG. 1 is a general perspective view of one example of a conventional ink jet printing apparatus.

In FIG. 1, a printing medium 5 wound in a form of a roll, is pinched between a pair of paper feed rollers 3 via a transporting rollers 1 and 2, and is fed in a direction f shown in the drawing by driving of an motor 50 a driving force of which is transmitted to the paper feed rollers 3. Across the printing medium 5, guide rails 6 and 7 are arranged in parallel relationship to each other. A printing head unit 9 mounted on a carriage 8 can scan transversely along the guide rails 6. The printing head unit 9 has heads 9Y, 9M, 9C and 9Bk respectively corresponding to four color inks of yellow, magenta, cyan and black and four ink tanks (not shown) corresponding to respective of four colors. The printing medium 5 is intermittently fed in a length corresponding to a width of ejection opening array of each head of the printing head unit 9. During an interval between feeding operations of the printing medium, the printing head unit 9 moves in a direction P shown in the drawing to eject ink droplets depending upon an image signal to perform printing.

In such serial scanning type ink jet printing apparatus, a density fluctuation of streak state may be caused at a boundary between portions respectively corresponding to respective scanning of the printing head to be a cause of degradation of an output image. This density fluctuation may be observed such as a band, and therefore, this density fluctuation is also called "banding". In discussion below, this visible phenomenon is referred as "streak."

As a printing apparatus solving such problem, there have been proposed an apparatus, in which an image signal corresponding to printing element located at the end among a plurality of printing elements, such as ink ejection openings of the printing head, is corrected for reducing a streak form density fluctuation at the boundary as set forth above. Another proposal is an apparatus in which of scanning is performed a plurality of times in respect of each pixel with mutually distinct plurality of printing elements, namely, multi-scanning printing is performed, to make a streak at the boundary not perceptible.

With the construction set forth above, it may provide some effect in reduction of the streak at the boundary. However, the effect of reduction of the streak at the boundary can be small for certain types of the printing medium. This is because the prior art as set forth above principally takes fluctuation of a feeding amount of the printing medium or bleeding of the ink in the printing medium, as a cause of the streak at the boundary portion. In connection with this, according to the invention's study of results of experiments, the streak can be caused by a different phenomenon. More specifically, it has been found that beading of the ink on the printing medium can also cause the streak at the boundary.

This is clearly different from the streak caused by fluctuation of feeding amount or so forth. For example, when the streak at the boundary is caused by fluctuation of the feeding amount, if the feeding amount is excessively large, a region not printed is remained to cause a white streak, and if the feeding amount is too small, a part of image in preceding and following scanning cycle overlaps to form a region having excessively high density to form a black streak. As a method for reducing such streak, there have been proposed methods to enhance precision of feeding amount as a first method, to set paper feeding amount to slightly overlap images in preceding scanning cycles and to thin the data at the overlapping portion, or to control ink ejection amount in the ink jet printing system as a second method. Even when the scanning images in preceding and following scanning cycles are precisely connected in the first method or when the data is thinned at the overlapping portion in the second method, beading can be caused at the boundary of each cycle of scanning image to cause the streak at the boundary.

More specifically, beading is a phenomenon that during a period from the timing of adhering of the ink droplet to the printing medium to completion of absorption, adjacent ink droplets are contacted to each other to cause admixing of the ink droplets due to surface tension of the ink.

Further discussion will be given hereinafter with respect to beading with reference to FIGS. 2 and 3.

FIG. 2 shows 128 in number of ink ejection openings in each of the heads shown in FIG. 1, and positional relationship of these ejection openings between respective heads. Namely, in respective heads, mutually corresponding ejection opens are located at the same position in the feeding direction of the printing medium (up and down direction on the drawing).

FIGS. 3A to 3D are illustrations showing a process to cause beading and influence thereof.

As shown in FIG. 3A, when a plurality of ink droplets are ejected at high density with respect to a printing width d, the ink droplets hitting the printing medium are in mutual contact before penetrating into the printing medium to cause beading between the ink droplets as shown in FIG. 3B.

Then, among an ink droplet group aligned in the printing width d, respective ink droplets of a central part of aligned droplet group contact with left and right adjacent ink droplets to be influenced to equalize forces to be applied to the ink droplets to become not motive. In contrast, the ink droplets at both ends of the ink droplet group have adjacent ink droplets at an inner side but no adjacent ink droplet at outer side, and thus only contact with the ink droplets at the inner side. By this, as shown in FIG. 3B, the ink droplets at both ends are pulled to each inner side to become respectively greater ink droplets.

The result of printing when the beading is caused has portions of higher density corresponding to the greater ink droplets at slightly inner side of the portions corresponding to the ends of the printing head. As a result, the streak at the boundary is formed together with the similar high density portion at the end of the adjacent scanning region. Such streak at the boundary due to occurrence of beading becomes more remarkable as greater amount of ink are ejected from respective printing heads for higher image density.

As can be clear from the above, beading can be easily caused when ink absorption speed of the printing medium is low. In case of the printing image recorded in the serial scanning type ink jet printing apparatus, the streak at the boundary can be caused at every printing scanning operation.

For such problem, the inventor has proposed a method to correct signals to be applied to respective printing elements in vicinity of ends of the printing head to the method set out above for obtaining the image with no streak at the boundary.

For example, it is assumed that in the printing head having the ink ejection openings arranged as shown in FIG. 4A, the density fluctuation to have higher density at both end portions as shown in FIG. 4C is caused when input signal level to be applied for ejection energy generating elements of respective ejection openings is uniform as shown in FIG. 4B. In this case, the input signal is corrected so that the input signals of a lower level are applied to the ejection energy generating elements of the ejection opening corresponding to the higher density portion as shown in FIG. 4D to reduce an ink ejection amount at the corresponding portions and whereby occurrence of beading or increasing of density at both ends due to beading can be reduced. In this case, when a printing system permits modulation of a dot diameter and/or dot density, the dot diameter to be printed by the ink ejected through the ejection opening at the ends of the head, is modulated depending upon the input signal level. For example, in a piezo type printing head, a driving voltage or pulse width to be applied to the piezoelectric element at the ends is reduced depending upon the input signal to reduce ejected ink amount for restricting increasing of dot diameter or dot density due to beading, and thus to make distribution of dot density uniform as shown in FIG. 4E. On the other hand, when modulating the dot diameter or dot density is not possible, or difficult, the number of dots to be printed is modulated depending upon the input signal to form lesser dots in the pixel corresponding to the ejection openings at the ends of the head for making density distribution uniform as shown in FIG. 4E.

By the way, as set forth above, since occurrence of the streak of density fluctuation at the boundary due to beading mainly depends on the ink absorption ability of the printing medium. Therefore, once the ink to be used for printing and the printing medium are determined, a correction amount of the image signal to be applied to the energy generation element, depends on only the image signal, namely a printing ink amount to be used corresponding to the image signal (more correctly, the printing ink amount per unit area and unit time).

On the other hand, the ink absorption speed of the printing medium may be variable depending upon moisture absorption condition in the ink absorbing surface of the printing medium due to variation of temperature and humidity of ambient air arid upon tolerance of the printing medium per production lot. In such case, it is possible that a preliminarily determined correction amount becomes inappropriate in correction for the streak at the boundary due to beading. Therefore, in a certain environmental condition, production lot of the printing medium or so forth, the streak at the boundary becomes more remarkable.

SUMMARY OF THE INVENTION

It is an object of the present invention to provide an ink jet printing apparatus which can constantly and effectively suppress beading irrespective of characteristics of printing medium or variation of temperature and humidity of the ambient air, and thus can print an image without causing any streak of density fluctuation.

Another object of the present invention is to provide an ink jet printing apparatus which can set a correction data for a density data depending upon variation of environmental condition of the apparatus and/or a printing medium, in a construction where correction of the density data for determining ink ejection number and ejection amount of ink ejection openings at both ends of an array of a plurality of ink ejection openings in an ink jet printing head.

In a first aspect of the present invention, there is provided an ink jet printing apparatus using a printing head having a plurality of ink ejection openings arranged in a predetermined direction and performing printing on a printing medium on a basis of density data corresponding to the plurality of ink ejection openings, the apparatus comprising:

a test pattern printing means for printing a test pattern on the printing medium to be used for printing by using the printing head;

a reading means for reading density of the printed test pattern printed by the test pattern printing means with correspondence to the plurality of ink ejection openings respectively;

a setting means for setting a correction data for correcting the density data corresponding to ink ejection openings at least at both end portions in a printing region to be printed, on a basis of the density corresponding to the ink ejection openings including ink ejection openings at both end portions of the current printing region and the density corresponding to the ink ejection openings other than the ink ejection openings at both end portion in the density read by the reading means; and a correction means for correcting the density data corresponding to the ink ejection openings at both end portions by the correction data set by the setting means.

In a second aspect of the present invention, there is provided an ink jet system using a printing head having a plurality of ink ejection openings arranged in a predetermined direction and performing printing on a printing medium on a basis of density data corresponding to the plurality of ink ejection openings, the system comprising:

a test pattern printing means for printing a test pattern on the printing medium to be used for printing by using the printing head;

a reading means for reading density of the printed test pattern printed by the test pattern printing means with correspondence to the plurality of ink ejection openings respectively;

a setting means for setting a correction data for correcting the density data corresponding to ink ejection openings at least at both end portions in a printing region to be printed, on a basis of the density corresponding to the ink ejection openings including ink ejection openings at both end portions of the current printing region and the density corresponding to the ink ejection openings other than the ink ejection openings at both end portions in the density read by the reading means; and a correction means for correcting the density data corresponding to the ink ejection openings at both end portions by the correction data set by the setting means.

BRIEF DESCRIPTION OF THE DRAWINGS

The present invention will be understood more fully from the detailed description given herebelow and from the accompanying drawings of the preferred embodiment of the invention, which, however, should not be taken to be limitative to the present invention, but are for explanation and understanding only.

In the drawings:

FIG. 6 is an illustration for explaining switching of ON and OFF of activity of a first image correcting portion and a second image correcting portion shown in FIG. 1, depending upon kinds of a printing medium.

DESCRIPTION OF THE PREFERRED EMBODIMENT

The preferred embodiments of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instances, well-known structures are not shown in detail in order not to unnecessarily obscure the present invention.

First Embodiment

Figure 5:
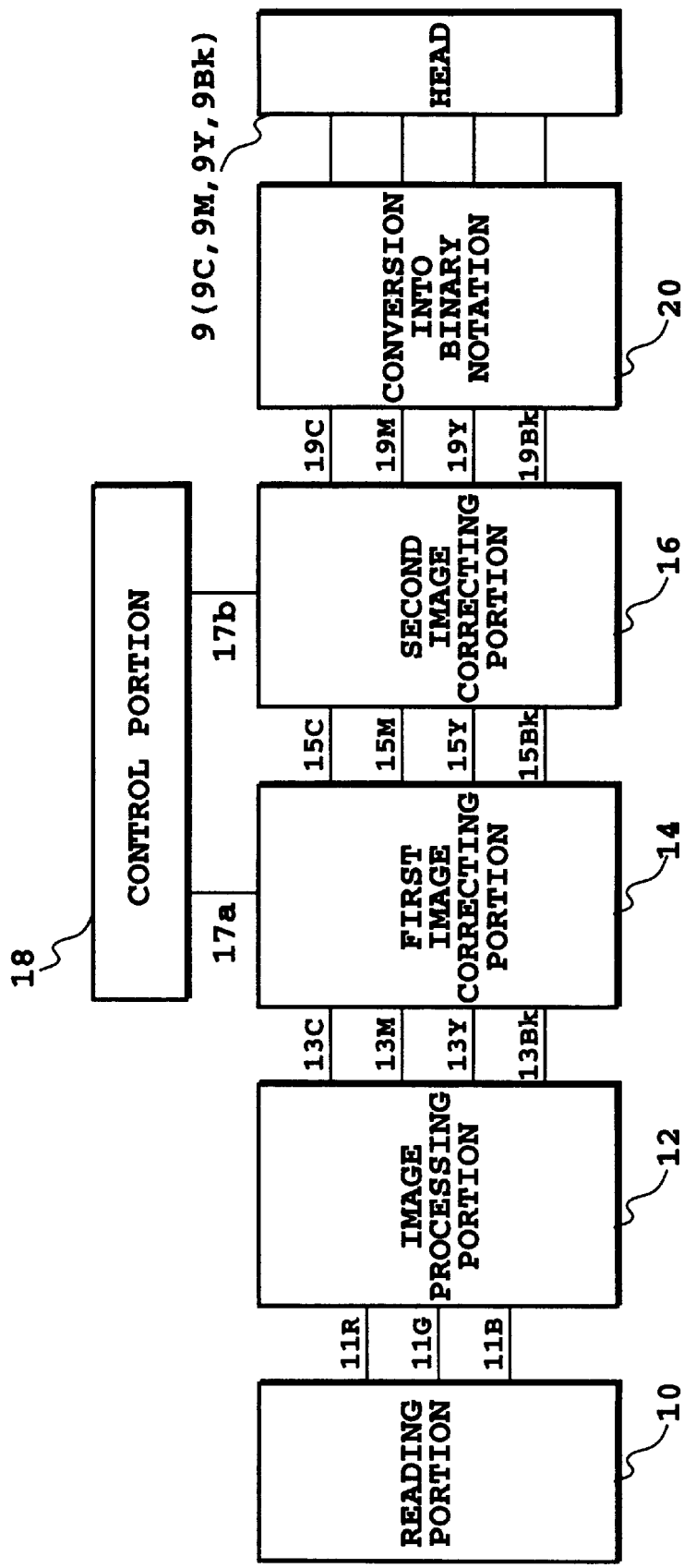
FIG. 5 is a block diagram showing a control construction for first to third embodiments of an ink jet printing apparatus according to the present invention.

FIG. 5 is a block diagram showing a construction of a control system of the first embodiment of an ink jet printing apparatus according to the present invention. It should be noted that as one example of mechanical construction of the ink jet printing apparatus, to which the present invention is applicable, the construction shown in FIG. 1 may be employed.

Here, a reference numeral 10 denotes a reading portion having photoelectric conversion elements, having three color filters of red (R), green (G) and blue (B) for reading an image by photoelectric conversion. As an example of such photoelectric conversion element, a charge coupled device (CCD) is known. Reference numerals 11R, 11G and 11B denote input image signals per unit pixel to be generated by the reading portion 10, and are red, green and blue signals, respectively. A reference numeral 12 denotes an image processing portion for performing processes log conversion, black extraction, masking, gamma conversion and so forth with respect to the read signals 11R, 11G and 11B for outputting four color image signals 13C, 13M, 13Y and 13Bk for cyan, magenta, yellow and black colors.

A reference numeral 14 denotes a first image correcting portion for receiving the image signals 13C, 13M, 13Y and 13Bk and effecting predetermined correction to output corrected image signals 15C, 15M, 15Y and 15Bk. For example, in a first image correcting portion 14, image correction is performed to reduce streak of density fluctuation at a boundary between scanning regions due to bleeding of an ink in the printing medium.

A reference numeral 16 denotes a second image correcting portion for effecting predetermined correction different from that effected by the first image correcting portion 14 for the image signals 15C, 15M, 15Y and 15Bk to output corrected image signals 19C, 19M, 19Y and l9Bk. In the second image correcting portion 16, image correction is performed to reduce streak of density fluctuation at the boundary caused by phenomenon other than that handled by the first image correcting portion, such as the streak caused by beading.

A reference numeral 18 denotes a control portion outputting respective control signals 17a and 17b to the first image correcting portion 14 and the second image correcting portion 16, respectively so as to control selection of effecting and not effecting of correction by the first image correcting portion 14 and the second image correcting portion 16, respectively. For instance, with respect to a plurality of kinds of the printing media, when the causes of occurrence of the streak at the bounderies are different to each other, the first and second image correcting portions 14 and 16 are selectively operated to effect correction depending upon the kind of the printing medium to be used. On the other hand, when the printing medium which may not cause the streak at the boundary is selected, both of the first and second image correcting portions 14 and 16 are held inoperative so as not to effect correction. Conversely, when the streak at the boundary may be caused by both causes, both of the first and second image correcting portions 14 and 16 are active for correcting both causes.

FIG. 6 is an illustration for explaining changeover of correction by the control signals 17a and 17b.

As shown, when the printing medium has a property to cause significant bleeding and beading, both control signals 17a and 17b are turned ON, for example. In the manner set forth above, the ON and OFF of the control signals 17a and 17b are combined to effect correction depending upon property of the printing medium to be used. It should be noted that judgement of the printing medium can be done by automatic detection using an optical sensor or by permitting an operator to enter designation through an operating portion of the main body of the printing apparatus. Also, it is possible to take environmental temperature and humidity as factors for determining the control signals.

The printing medium, such as a common paper, a specialized paper for an ink jet printing system, a transparency film used in an overhead projector, a back printed film as a transparent medium on a back side of which an ink absorbing layer is coated and from a front side of which a printed image is observed, a cloth and a wood plate, may be used in the ink jet printing apparatus of the shown embodiment. These printing medium differ form each other in ink absolving property such as absorbing speed, a absorbing direction and so forth, depending upon quality of the printing medium, and therefore, these printing medium differ form each other in degree of causing of beading. For example, in comparing the specialized paper with the common paper, the specialized paper has the property of a greater ink absorbing speed so that an ink deposited on the specialized paper is less affected by an adjacent deposited ink and the beading is less caused.

Again referring to FIG. 5, the corrected image signals 19C, 19M, 19Y and l9Bk are converted into binary notation data by a conversion circuit 20 employing dither method or error diffusion method and then input to a driver for ink jet head 9. By this, respective heads 9C, 9M, 9Y and 9Bk are driven.

Figure 1:
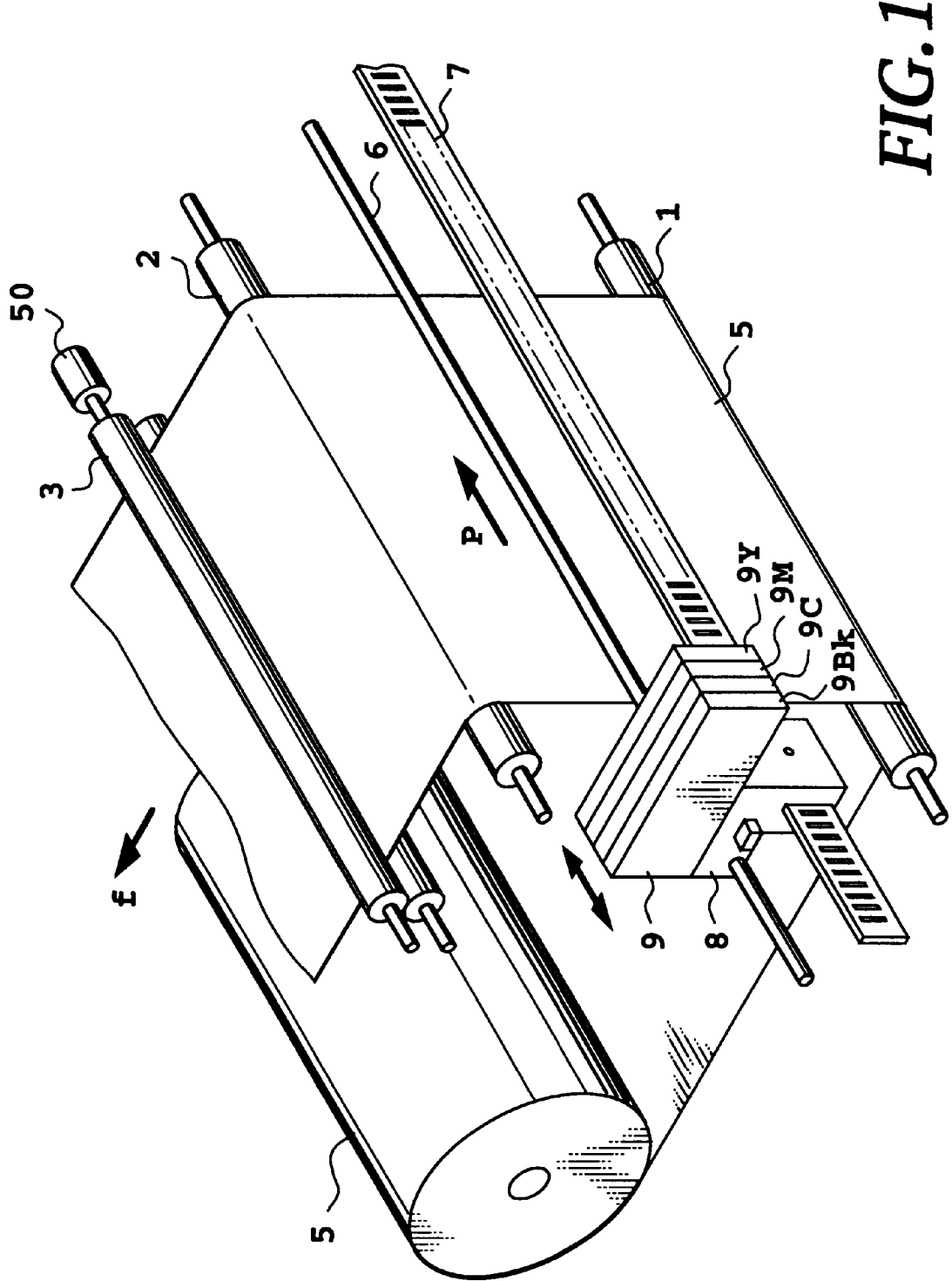
FIG. 1 is a perspective view showing one example of construction of an ink jet printing apparatus, to which the present invention is applicable.
Figure 2:
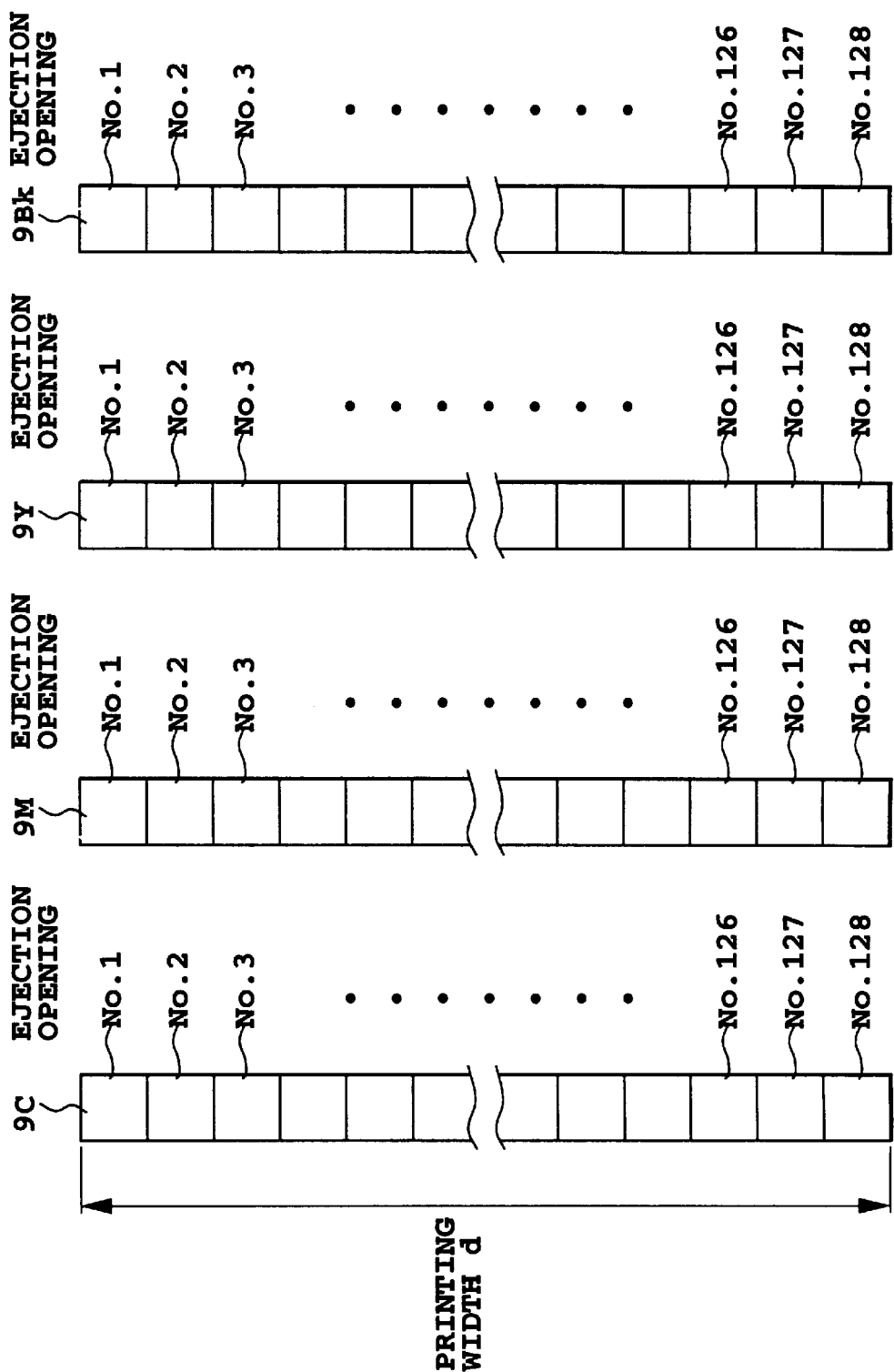
FIG. 2 is an illustration diagrammatically showing arrangement of ink jet printing heads shown in FIG. 1.
Figure 3A:
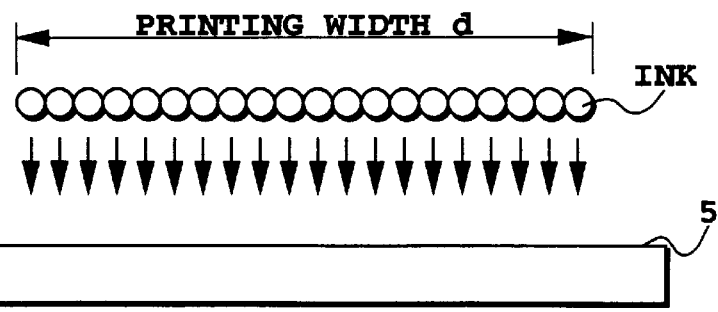
FIGS. 3A to 3D are illustrations for explaining the occurrence of streak mainly due to beading.
Figure 3B:
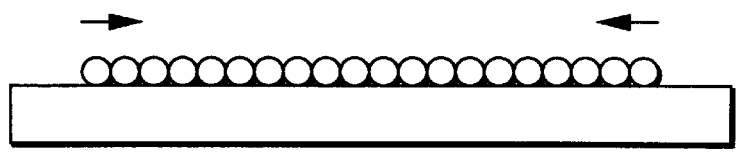
Figure 3C:
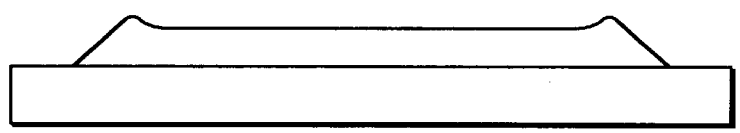
Figure 3D:
Figure 4A:
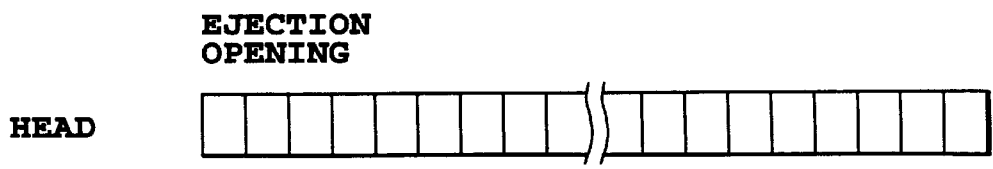
FIGS. 4A to 4E are illustrations for explaining correction of an image signal.
Figure 4B:
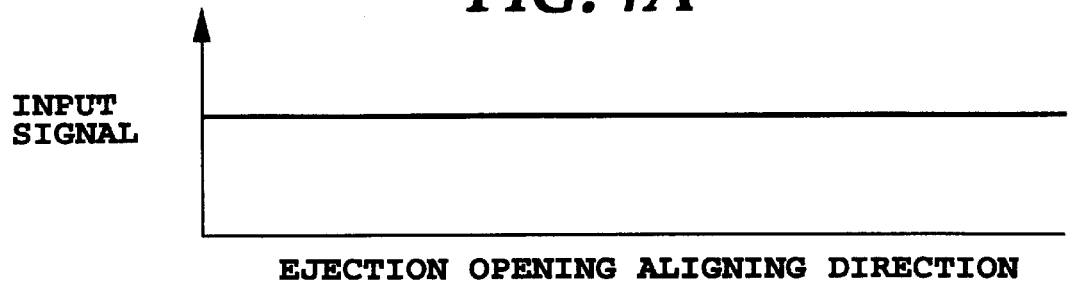
Figure 4C:
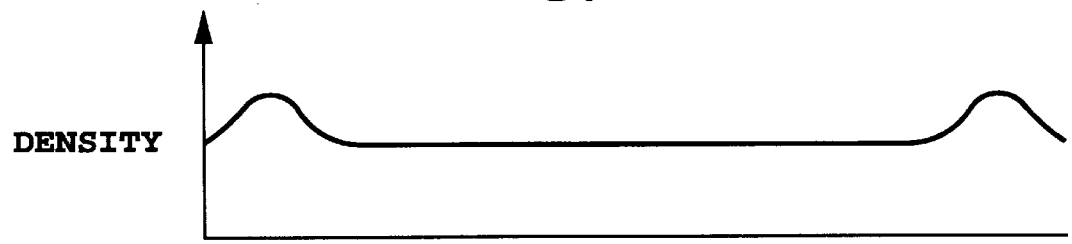
Figure 4D:
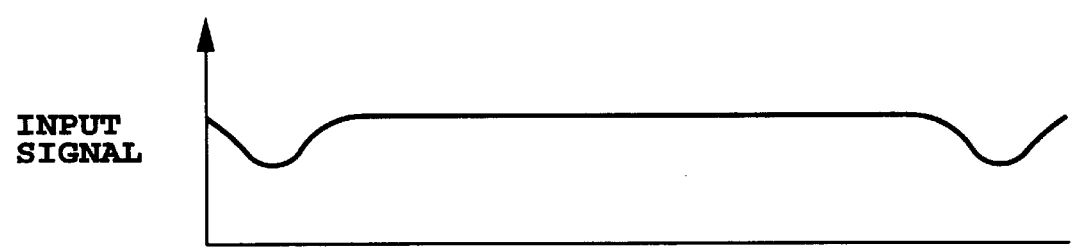
Figure 4E:
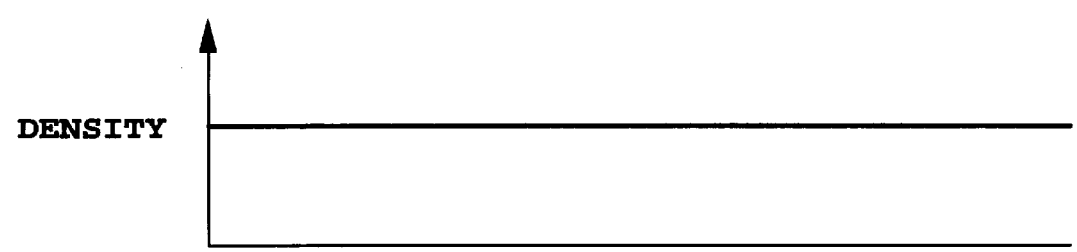

More specifically, as shown in FIGS. 1 and 2, the head 9 is constituted of a head 9C for cyan ink, a head 9M for magenta ink, a head 9Y for yellow ink and a head 9Bk for black ink. Each head has 128 ejection openings. The ink jet heads 9C, 9M, 9Y and 9Bk arranged as shown in FIG. 2 perform a scanning operation. During the scanning, the foregoing signals 19C, 19M. 19Y and 19Bk are supplied. Thus, full color image printing is performed.

Further detailed discussion will be given hereinafter for the first image correcting portion 14 and the second image correcting portion 16.

Figure 7:
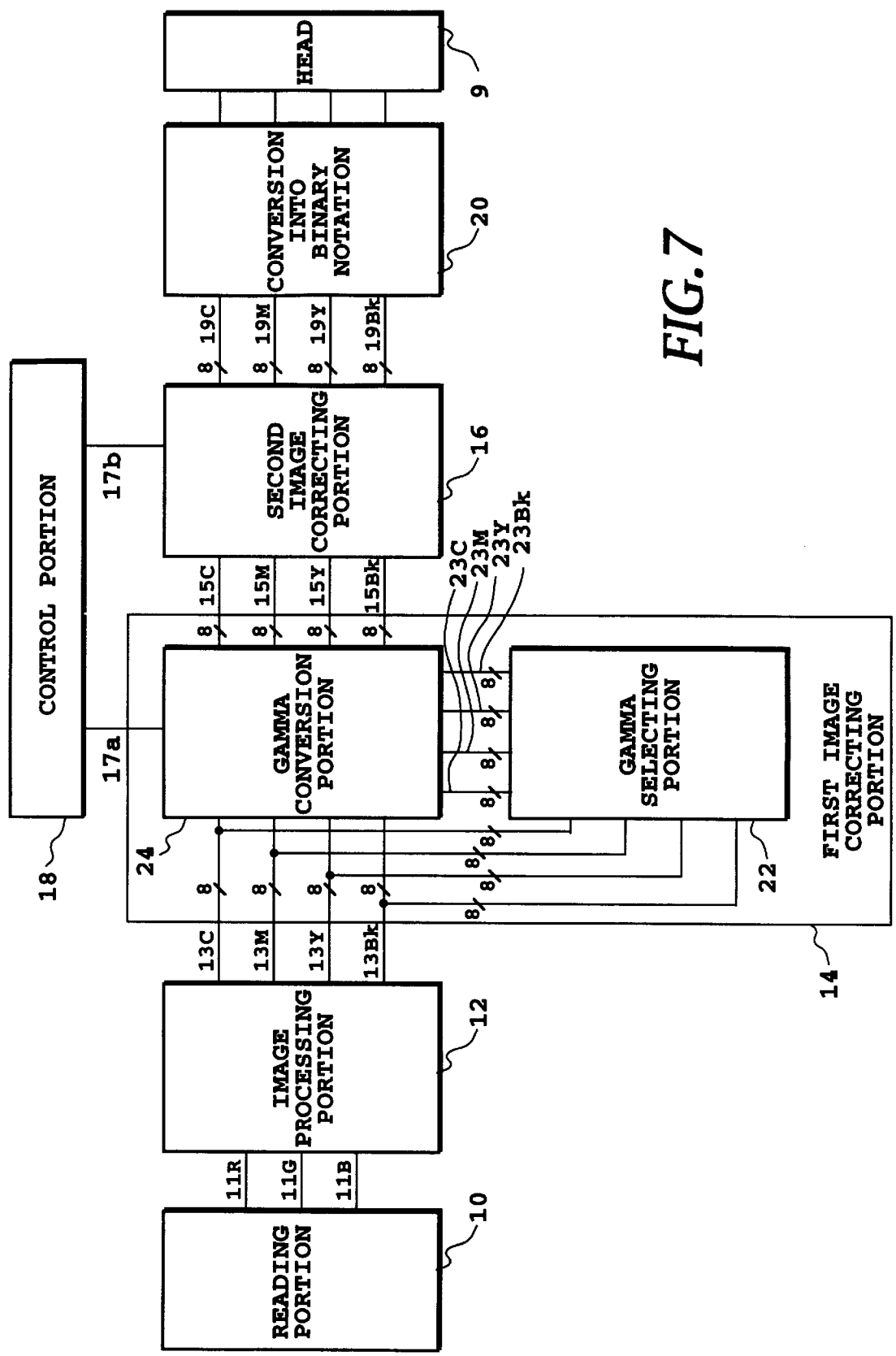
FIG. 7 is a block diagram showing the details of the first image correcting portion shown in FIG. 5.

FIG. 7 is a block diagram mainly showing a detail of the first image correcting portion 14. As set forth above, this correcting portion corrects signal for restricting the streak mainly due to bleeding of the ink.

Figure 8:
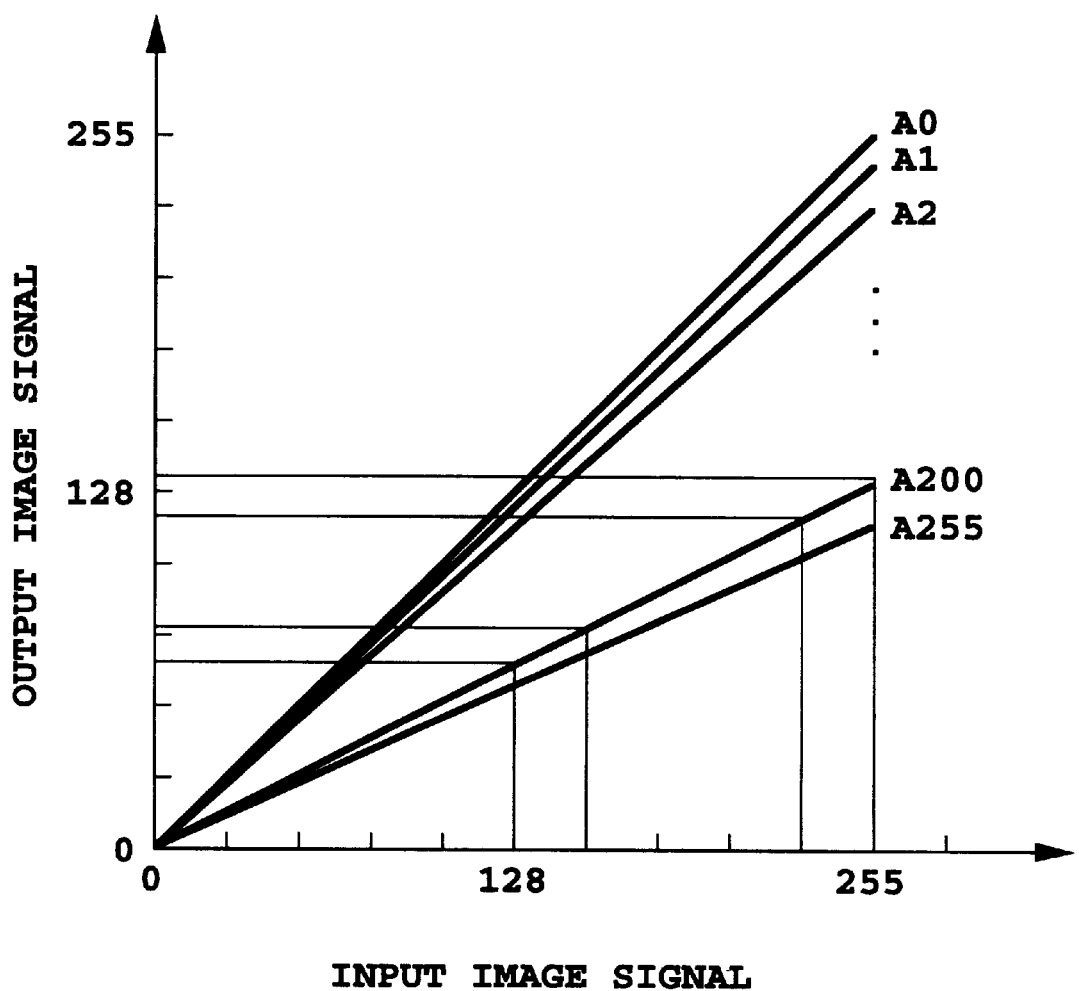
FIG. 8 is an illustration diagrammatically showing a gamma conversion table in a gamma conversion portion shown in FIG. 7.

The image signals 13C, 13M, 13Y and l3Bk of cyan, magenta, yellow and black output from the image processing portion 12 are input to a gamma selecting portion 22 of the first image correcting portion 14. The gamma selecting portion 22 outputs 8 bits gamma selection signals 23C, 23M, 23Y and 23Bk depending upon the image signals 13C, 13M, 13Y and 13Bk. In a gamma conversion portion 24, as shown in FIG. 8, 256 gamma conversion tables having conversion characteristics respectively expressed by curves A0 to A255 are stored for respective colors or commonly for respective colors. As shown in FIG. 8. assuming an input image signal is X and an output image signal is Y, respective conversion tables have conversion characteristics of:

$$A0 ; Y = X$$
$$A1 ; Y = 0.998X$$
$$A2 ; Y = 0.996X$$
$$\vdots \quad \vdots$$
$$\vdots \quad \vdots$$
$$An ; Y = (1-0.002n)X$$

wherein n=0 to 255

Here, the gamma selecting portion 22 outputs "0" to select the table A0 when the control signal 17a is "0", namely the signal to be processed is the signal other than that of the pixel at the end of the scanning region or, when the signal is that of the end pixel but correction by the first image correcting portion is not effected. By this, the input image signals 13C. 13M, 13Y and 13Bk become the corrected image signals 15C, 15M, 15Y and 15Bk as they are. On the other hand, when the signal of the end pixel is to be processed and when the control signal is "1", the gamma selection signals depending upon the input image signals 13C, 13M, 13Y and 13Bk are output to select the corresponding tables. More specifically, at this time, the gamma selecting portion 22 calculates a ground sum S of levels of the image signals 13C, 13M, 13Y and 13Bk and selects the table depending upon a value of S. Namely, assuming S=13C+13M+13Y+13Bk, since tone level of each color is 0 to 255, $0 \leq S \leq 1020$ is established. By dividing the possible value range of S into 256 levels, A0, A1, . . . , A255 are assigned for respective of the divided ranges. By this, depending upon the value of S based on an image signals 13C, 13M, 13Y and 13Bk, the gamma table can be selected. More concretely, at greater value of S, the table having smaller gradient of the line in FIG. 8 is selected. By this, when the ground sum of the signal level of the end pixels is large and thus the ink amount is large, the signal value is reduced to be smaller by correction with the selected table to reduce the ink amount at the end pixel for preventing bleeding.

As set forth above, the corrected image signals 15C, 15M, 15Y and 15Bk are input to the second correcting portion 16.

In the second image correcting portion 16, when the control signal 17b is "0", correction is not effected and the input image signals 15C, 15M, 15Y and 15Bk are output as signals 19C, 19M, 19Y and 19C, as they are. On the other hand, when the control signal is "1", correction which will be discussed later, is effected for outputting corrected image signals 19C, 19M, 19Y and 19Bk. Thereafter, the image signals 19C, 19M, 19Y and 19Bk are digitized converted into binary signals by the binarization portion 20 to be input to head drivers of the heads of cyan, magenta, yellow and black for performing color image printing.

As set forth above, in the case of the image signals corresponding to the end pixels of the scanning region (in the most case, these image signals correspond to the ejection openings at the end portions of the heads), gamma conversion is performed as shown in FIG. 8 on a basis of the table selected in the first image correcting portion 14. By this, the amount of the ink to be ejected for the end pixels is reduced to significantly decrease the streak at the boundary due to bleeding of the ink in the printing medium.

Figure 9:
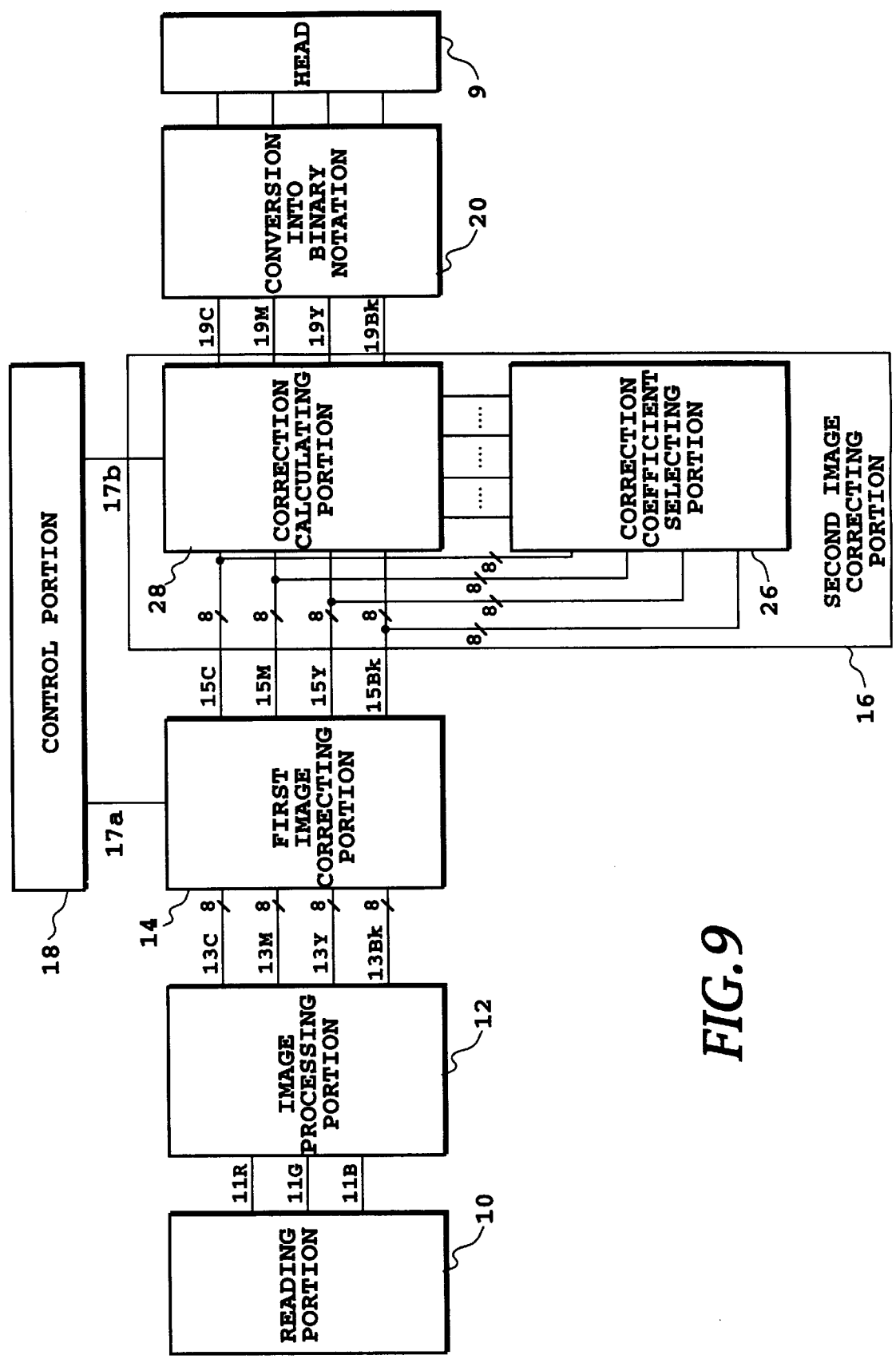
FIG. 9 is a block diagram showing the details of the second image correcting portion shown in FIG. 5.

Next, the second image correcting portion will be discussed hereinafter in detail with reference to FIG. 9.

A selecting portion 26 which selects a coefficient of correction receives the signals 15C, 15M, 15Y and 15Bk of cyan, magenta, yellow and black output from the first image correcting portion 14 to output following coefficient variable depending upon the values of the input image signals.

$$\alpha cc, \alpha cm, \alpha cy, \alpha cbk$$
$$\alpha mc, \alpha mm, \alpha my, \alpha mbk$$
$$\alpha yc, \alpha ym, \alpha yy, \alpha ybk$$
$$\alpha bkc, \alpha bkm, \alpha bky, \alpha bkbk$$

Namely, when these coefficients are expressed by:

aij (i=c, m, c, bk, and j=c, m, y, bk)

aij should be in a range of:

$0 \leq aij \leq 1$

Thus, aij can be output by referring to a look-up table (hereinafter also referred to as LUT) in the correction coefficient selecting portion 26 on a basis of the input image signals 15C, 15M, 15C and 15Bk.

Figure 10:
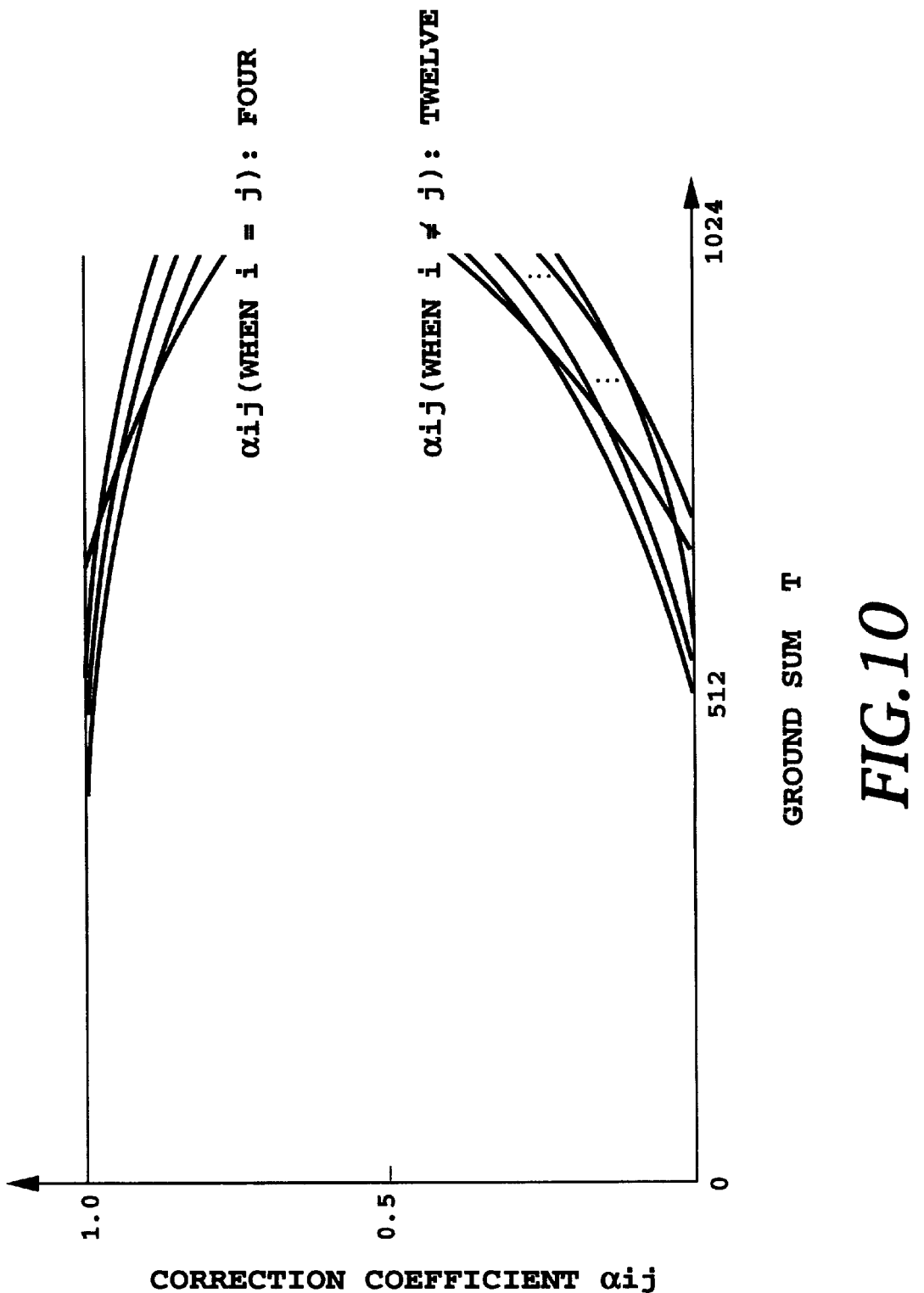
FIG. 10 is an illustration diagrammatically showing a table of relationship between a correction coefficient in a correction coefficient selecting portion shown in FIG. 9 and a ground sum of an input image signal.

As shown in detail in FIG. 10, the LUT outputs aij=1 (when i=j), and aij=0 (when i≠j)

when the values of the input image signals 15C, 15M, 15C and 15 Bk are small, and aij is set to be smaller when i=j and larger when i≠j as the values of the input image signals 15C, 15M, 15Y and 15Bk become larger.

A correction calculating portion 28 receives the signals 15C, 15M, 15Y and 15Bk of cyan, magenta, yellow and black output from the first image correcting portion and sixteen coefficients aij output from the selecting portion 26 to perform the following arithmetic operation on a basis of the inputs and to output the corrected image signals 19C, 19M, 19Y and 19Bk. More specifically, defining that the input image signals 15C, 15M, 15Y and 15Bk are respectively C, M, Y and Bk, and the corrected image signals 19C, 19M, 19Y and 19Bk are respectively C', M', Y' and Bk', the following matrix operation is performed.

$$\begin{pmatrix} C' \\ M' \\ Y' \\ Bk' \end{pmatrix} = \begin{pmatrix} \alpha cc & -\alpha cm & -\alpha cy & -\alpha cbk \\ -\alpha mc & \alpha mm & -\alpha my & -\alpha mbk \\ -\alpha yc & -\alpha ym & \alpha yy & -\alpha ybk \\ -\alpha bkc & -\alpha bkm & -\alpha bky & -\alpha bkbk \end{pmatrix} \begin{pmatrix} C \\ M \\ Y \\ Bk \end{pmatrix}$$

It should be noted that, in the above matrix operation, when C'<0, M'<0, Y'<0 and Bk'<0, respectively, C'=0, M'=0, Y'=0 and Bk'=0 are output as respective converted values.

Here, correcting calculation is controlled by the control signal 17b output from the control portion 18, and when the control signal 17b is "0", correcting calculation is not performed and thus C'=C
M'=M
Y'=Y and
Bk'=Bk On the other hand, when the control signal 17b is "1", namely, for the case of the image signal corresponding to the ejection openings at the ends of the head, the matrix operation is performed with the selected correction coefficient.

FIG. 10 shows a relationship between the input image signal and the coefficient aij, namely shows the LUT in the selecting portion 26. In FIG. 10, the horizontal axis represents the ground sum T of levels of the input image signals 15C, 15M, 15Y and 15Bk of respective printing head with respect to a unit pixel, and the vertical axis represents a value of the coefficient aij. As shown in FIG. 10, sixteen LUTs are used per each i and each j of the coefficient. Respective LUTs output:

aij=1 (when i=j) and
aij≠0 (when i≠j)

when the ground sum T of the levels of the input image signals 15C, 15M, 15Y and 15Bk is small. Namely, when the values of C, M, Y and Bk of the input image signals are small:

$$\begin{pmatrix} C' \\ M' \\ Y' \\ Bk' \end{pmatrix} = \begin{pmatrix} 1 & 0 & 0 & 0 \\ 0 & 1 & 0 & 0 \\ 0 & 0 & 1 & 0 \\ 0 & 0 & 0 & 1 \end{pmatrix} \begin{pmatrix} C \\ M \\ Y \\ Bk \end{pmatrix}$$

Namely, conversion expressed by

C'=C
M'=M
Y'=Y
Bk'=Bk is performed.

Conversely, according to increasing of the ground sum T of the levels of the input image signals 15C, 15M, 15Y and 16Bk, aij is set to be smaller when i=j
greater when i≠j For example, in the case that the input image signal is expressed by 8 bits of 0 to 255, and assuming that C=250, M=200, Y=Bk=0, since the ground sum T of the input image signals is 460, with reference to respective LUTs of FIG. 10, aij is expressed by:

$$\begin{pmatrix} \alpha cc & \alpha cm & \alpha cy & \alpha cbk \\ \alpha mc & \alpha mm & \alpha my & \alpha mbk \\ \alpha yc & \alpha ym & \alpha yy & \alpha ybk \\ \alpha bkc & \alpha bkm & \alpha bky & \alpha bkbk \end{pmatrix} = \begin{pmatrix} 0.98 & 0.02 & 0.01 & 0.00 \\ 0.02 & 0.95 & 0.02 & 0.02 \\ 0.00 & 0.05 & 0.95 & 0.04 \\ 0.00 & 0.00 & 0.01 & 1.00 \end{pmatrix}$$

By performing matrix operation with using these coefficients, C', M', Y' and Bk' are respectively expressed as follows:

$$C' = 0.98 \times 250 - 0.20 \times 200 - 0.01 \times 0 - 0.00 \times 0 = 205$$

$$M' = -0.02 \times 250 + 0.95 \times 200 - 0.02 \times 0 - 0.02 \times 0 = 185$$

$$Y' = -0.00 \times 250 - 0.05 \times 200 + 0.95 \times 0 - 0.04 \times 0 = -10 \to 0$$

$$Bk' = -0.00 \times 250 - 0.00 \times 200 - 0.01 \times 0 + 1.00 \times 0 = 0$$

Namely, the level 250 of cyan is converted to be 205, and the level 200 of magenta is converted to be 185 and yellow and black are held unchanged at 0. Thus as a whole, calculation to reduce the values relative to the input image signal can be accomplished.

By performing such correcting calculation for the image signal, the ink droplet to be ejected from the ejection openings at the ends of the printing head or so forth can be reduced or the amount of the ink to be ejected is reduced for reducing the streak at the boundary which can be caused by beading which can be caused on the output image, particularly at the high density portion thereof.

Figure 11:
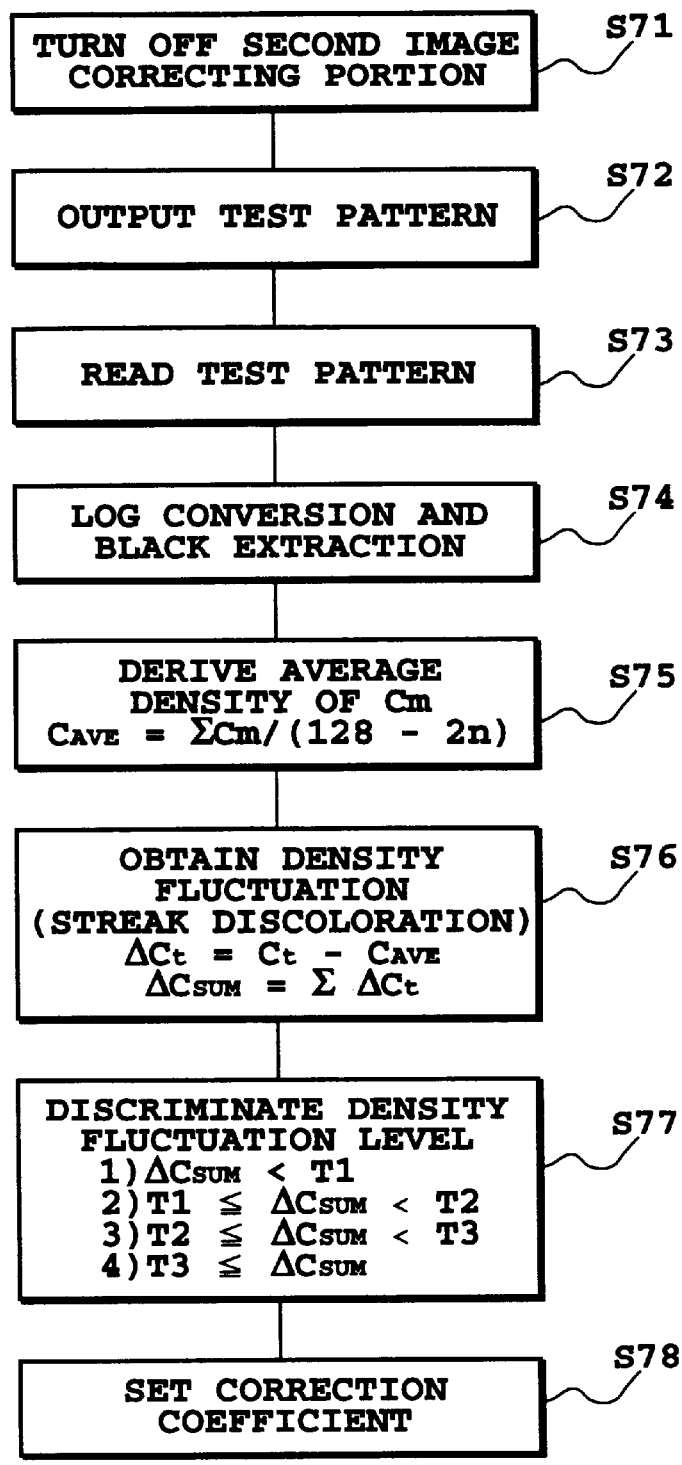
FIG. 11 is a flowchart showing procedure for setting the correction coefficient of the second image correcting portion.

The coefficient of correction to be used in the second image correcting portion as set forth above, is desired to be re-set as required since magnitude of beading tends to be different depending upon moisture absorbing condition of the printing medium and various other factors. A method for setting the correction coefficient will be discussed hereinafter with reference to FIG. 11.

At first, by setting the control signal 17b at "0", the second image correcting portion 16 is disabled so as not to effect correction. Thus, the image correction is not performed at all (step S71 of FIG. 11). Next, a test pattern data is output from a control circuit different from a circuit shown in FIG. 9 to perform test pattern printing on the printing medium to be used for printing, on a basis of the test pattern data, by using the head 9 (step S72). Here, the test pattern may be a uniform pattern with any printing duty ratio. Since the streak at the boundary due to occurrence of beading is frequently caused at high printing duty ratio, the printing duty ratio is preferably set at 75% to 100% in the case of single color, 160% to 200% in the case of two colors in multi color printing or 200% to 300% in the case of three colors. The duty ratio can be changed according to the kind of the printing medium. Here, 100% duty of the uniform pattern is printed with respective of the cyan, magenta, yellow and black.

The output pattern is read by the reading portion 10 (step S73). These three color read signals 11R, 11G and 11B are processed only for log conversion and black extraction (step S74) and converted into respective density signals of cyan, magenta, yellow and black. From these signals, data of the streak at the boundary of respective color in the image printed at step S72 can be obtained. Here, for simplicity, discussion will be given for setting of the correction coefficient by obtaining the data of the streak at the boundary of the cyan head to enable correction of the streak at the boundary.

Among a density signal of cyan obtained corresponding to 128 in number of ejection openings of the cyan head 9C, the signals obtained corresponding to respective n in number of ejection openings at both ends are assumed to be Ct (t=1 to n, (128–n) to 128), and signals obtained corresponding to other ejection openings are assumed to be Cm (m=(n+1) to (127–n). Then, an average density of the signal Cm is calculated by at step S75:

$$C_{AVE} = \Sigma cm/(128-2n)$$

Next, offsetting of densities corresponding to respective n in number of ejection openings at both ends of the head from the average density $C_{AVE}$ is calculated through the following equation:

$$\Delta_{Ct} = Ct - C_{AVE}$$

Then, a sum $\Delta_{SUM}$ of $\Delta_{Ct}$ is calculated (step S76) as follows.

$$\Delta C_{SUM} = \Sigma \Delta_{Ct}$$

Here, when a value of $\Delta C_{SUM}$ is large, it means that the density at the end of the test pattern of cyan is high. Namely, judgement is made that the streak at the boundary is significant. On the other hand, when the value of $\Delta C_{SUM}$ is small, the density at the end portion is not different from the portion other than the end portion. Namely, judgement is made that the streak at the boundary is not remarkable. More concretely, four levels of the streak at the boundary are preliminary set, and sets of acj (j=k, c, m, y) of correction coefficients are set per respective levels. The levels of the streak at the boundary, that is, the value of the sum $\Delta C_{SUM}$, is judged to be corresponded to one of the four levels, which are defined following 1) to 4), on a basis of threshold valves T1, T2 and T3 (T1<T2<T3). Depending upon the judged level, the set of correction coefficient acj is assigned (step S77).

1) $\Delta C_{SUM} < T1$
2) $T1 \leq \Delta C_{SUM} < T2$
3) $T2 \leq \Delta C_{SUM} < T3$
4) $T3 \leq \Delta C_{SUM}$ By performing the similar operation with respect to magenta, yellow and black, the tables of the correction coefficients are set as shown in FIG. 10 (step S78). Curves shown in FIG. 10 define the tables respectively, and can be obtained as curves in a condition that printing is performed experimentally so as not to show the streak at the boundary in the image because the curves depend upon characteristics of the ink and of the printing medium. In addition, the threshold values T1, T2, T3 are preliminarily set depending upon the kind of the printing medium.

With the correction coefficients set as set forth above, the foregoing image correcting calculation is performed to perform correction of the streak at the boundary mainly caused by the beading.

It should be noted that, in the shown embodiment, upon setting of the correction coefficients in the second image correcting portion, density fluctuation (the streak at the boundary) is read from the printed test pattern. However, method the for judging the density fluctuation may differ. For example, it may be possible to take the maximum density in the distribution of density fluctuation in the aligning direction of the ejection openings as reference for judgement, or, in the alternative, a half value width (FWHM) of the distribution area can be referenced for judgement.

On the other hand, when a printing system can modulate the dot diameter, such as a piezo-type ink jet, the streak at the boundary can be corrected by modulating the driving voltage or the drive pulse width.

Also, the test pattern is not limited to the single color, mixed color pattern of two or three colors or combination of both patterns may be employed. In certain kinds of printing medium, by reading the mixed color pattern, the streak at the boundary which cannot be detected by the single color pattern, in which each color is printed independently, can be fed back to the image correcting portion to obtain further effect.

Furthermore, reading of the printed test pattern may be done by a user or serviceman performing maintenance or inspection by reading the printed test pattern at the reading portion, or, in the alternative, by automatically reading the printed test pattern.

In addition, the first image correcting portion has fixed correction amount determined depending upon the image signal as set forth above. However, it is possible to print the test pattern and vary the correction amount on the basis of the result of printing of the test pattern similarly to the second image correcting portion.

Furthermore, in the shown embodiment, while only the first image correcting portion and the second image correcting portion are employed as the image correcting portion, the number of image correction portions is not limited. Namely, when n in number of physical phenomena are considered as causes of the streak form discoloration at the scanning boundary, it is possible to effectively reduce the streak form discoloration at the scanning boundary by providing n in number of correcting portions of the first image correcting portion to the (n)th image correcting portion.

Second Embodiment

In the second embodiment, the same circuit construction as the foregoing first embodiment (see FIG. 5) is employed, and selection method of the gamma conversion table in the gamma selecting portion of the first image correcting portion and the selection method of the correction coefficient in the correction coefficient selecting portion of the second image correcting portion are modified.

More specifically, in the first embodiment, switching of an image correcting method depends upon a plurality of factors to cause the streaks, at the boundaries. However, in the shown embodiment, a plurality of gamma conversion tables and correction coefficients, with which correction can be performed, may be preliminarily provided corresponding to a plurality of printing medium having different degree of characteristics of causing the streak at the boundary. Here, selection of the gamma conversion table and the correction coefficient may be variable depending upon the printing medium and are selected by the control signal from the control portion.

With the shown embodiment, optimal reduction of the streak at the boundary adapted for a plurality of printing medium can be performed.

Third Embodiment

The third embodiment of the present invention employs the same circuit construction as the first embodiment (see FIG. 5), and a method for image correction in the second image correction portion is modified.

While the coefficient of correction is modified as required in the first embodiment, the shown embodiment modifies the number of ejection openings at the end portions of the head to effect correction. More specifically, for increasing the image correction amount, the number of ejection openings to be corrected is increased, and for decreasing the image correction amount, the number of the ejection openings to be corrected is decreased. For example, while the first embodiment sets the coefficient of correction by discriminating the levels of the streak at the boundary into four levels from the test pattern, the shown embodiment varies correction amount by varying number of ejection openings to effect correction in the following manner:

ejection opening to be corrected

1) $\Delta C_{SUM} < T1 \rightarrow$ non
2) $T1 \leq \Delta C_{SUM} < T2 \rightarrow$ No. 1, 128
3) $T2 \leq \Delta C_{SUM} < T3 \rightarrow$ No. 1, 2, 127, 128
4) $T3 \leq \Delta C_{SUM} \rightarrow$ No. 1, 2, 3, 126, 127, 128

In this case, the coefficient of correction at the four levels may be fixed or set respectively. Also, it is not always required to include the ejection opening at the outermost end.

It should be noted that the present invention is effectively applicable not only to the color image printing apparatus but also to the apparatus for performing monochrome gradation printing. In this case, the applicable apparatus can be one having a plurality of printing heads having mutually different ink ejection amount or a plurality of printing heads having mutually different ink density, or one employing a single printing head to perform gradation printing by a plurality of times of printing or differentiating the driving condition, in the ink jet printing apparatus, for example.

The present invention achieves distinct effect when applied to a recording head or a recording apparatus which has means for generating thermal energy such as electrothermal transducers or laser light, and which causes changes in ink by the thermal energy so as to eject ink. This is because such a system can achieve a high density and high resolution recording.

A typical structure and operational principle thereof is disclosed in U.S. Pat. Nos. 4,723,129 and 4,740,796, and it is preferable to use this basic principle to implement such a system. Although this system can be applied either to on-demand type or continuous type ink jet recording systems, it is particularly suitable for the on-demand type apparatus. This is because the on-demand type apparatus has electrothermal transducers, each disposed on a sheet or liquid passage that retains liquid (ink), and operates as follows: first, one or more drive signals are applied to the electrothermal transducers to cause thermal energy corresponding to recording information; second, the thermal energy induces sudden temperature rise that exceeds the nucleate boiling so as to cause the film boiling on heating portions of the recording head; and third, bubbles are grown in the liquid (ink) corresponding to the drive signals. By using the growth and collapse of the bubbles, the ink is expelled from at least one of the ink ejection orifices of the head to form one or more ink drops. The drive signal in the form of a pulse is preferable because the growth and collapse of the bubbles can be achieved instantaneously and suitably by this form of drive signal. As a drive signal in the form of a pulse, those described in U.S. Pat. Nos. 4,463,359 and 4,345,262 are preferable. In addition, it is preferable that the rate of temperature rise of the heating portions described in U.S. Pat. No. 4,313,124 be adopted to achieve better recording.

U.S. Pat. Nos. 4,558,333 and 4,459,600 disclose the following structure of a recording head, which is incorporated to the present invention: this structure includes heating portions disposed on bent portions in addition to a combination of the ejection orifices, liquid passages and the electrothermal transducers disclosed in the above patents. Moreover, the present invention can be applied to structures disclosed in Japanese Patent Application Laid-open Nos. 123670/1984 and 138461/1984 in order to achieve similar effects. The former discloses a structure in which a slit common to all the electrothermal transducers is used as ejection orifices of the electrothermal transducers, and the latter discloses a structure in which openings for absorbing pressure waves caused by thermal energy are formed corresponding to the ejection orifices. Thus, irrespective of the type of the recording head, the present invention can achieve recording positively and effectively.

In addition, the present invention can be applied to various serial type recording heads: a recording head fixed to the main assembly of a recording apparatus; a conveniently replaceable chip type recording head which, when loaded on the main assembly of a recording apparatus, is electrically connected to the main assembly, and is supplied with ink therefrom; and a cartridge type recording head integrally including an ink reservoir.

It is further preferable to add a recovery system, or a preliminary auxiliary system for a recording head as a constituent of the recording apparatus because they serve to make the effect of the present invention more reliable. Examples of the recovery system are a capping means and a cleaning means for the recording head, and a pressure or suction means for the recording head. Examples of the preliminary auxiliary system are a preliminary heating means utilizing electrothermal transducers or a combination of other heater elements and the electrothermal transducers, and a means for carrying out preliminary ejection of ink independently of the ejection for recording.

The number and type of recording heads to be mounted on a recording apparatus can be also changed. For example, only one recording head corresponding to a single color ink, or a plurality of recording heads corresponding to a plurality of inks different in color or concentration can be used. In other words, the present invention can be effectively applied to an apparatus having at least one of the monochromatic, multi-color and full-color modes. Here, the monochromatic mode performs recording by using only one major color such as black. The multi-color mode carries out recording by using different color inks, and the full-color mode performs recording by color mixing.

Furthermore, although the above-described embodiments use liquid ink, inks that are liquid when the recording signal is applied can be used: for example, inks can be employed that solidify at a temperature lower than the room temperature and are softened or liquefied in the room temperature. This is because in the ink jet system, the ink is generally temperature adjusted in a range of 30° C.–70° C. so that the viscosity of the ink is maintained at such a value that the ink can be ejected reliably.

In addition, the present invention can be applied to such apparatus where the ink is liquefied just before the ejection by the thermal energy as follows so that the ink is expelled from the orifices in the liquid state, and then begins to solidify on hitting the recording medium, thereby preventing the ink evaporation: the ink is transformed from solid to liquid state by positively utilizing the thermal energy which would otherwise cause the temperature rise; or the ink, which is dry when left in air, is liquefied in response to the thermal energy of the recording signal. In such cases, the ink may be retained in recesses or through holes formed in a porous sheet as liquid or solid substances so that the ink faces the electrothermal transducers as described in Japanese Patent Application Laid-open Nos. 56847/1979 or 71260/1985. The present invention is most effective when it uses the film boiling phenomenon to expel the ink.

Furthermore, the ink jet recording apparatus of the present invention can be employed not only as an image output terminal of an information processing device such as a computer, but also as an output device of a copying machine including a reader, and as an output device of a facsimile apparatus; having a transmission and receiving function.

The present invention has been described in detail with respect to various embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. An ink jet printing apparatus using a printing head having a plurality of ink ejection elements arranged in a predetermined direction and performing printing on a printing medium on a basis of image data corresponding to said plurality of ink ejection elements, said apparatus comprising:

test pattern printing means for printing a test pattern, based on the image data corresponding to the test pattern, on the printing medium to be used for printing by using the ink ejection elements of the printing head;

reading means for reading density of the test pattern printed by said test pattern printing means so as to obtain density corresponding to each of said plurality of ink ejection elements used for printing said test pattern;

setting means for setting correction data for correcting the image data corresponding to the ink ejection elements used for printing portions including at least both end portions of a printing region to be printed, on a basis of differences between the density corresponding to a first group of ink ejection elements including ink ejection elements at both end portions of the printing region and an average density value corresponding to a second group of ink ejection elements that excludes the first group of ink ejection elements;

correction means for correcting the image data corresponding to said ink ejection elements at both end portions on a basis of the correction data set by said setting means; and controlling means for controlling correction of the image data performed by said correction means, the image data corresponding to the test pattern, when said setting means sets the correction data corresponding to the ink ejection elements, wherein said controlling means controls said correction means based on the correction data respectively corresponding to the first group of ink ejection elements and the second group of ink ejection elements.

2. An ink jet printing apparatus as claimed in claim 1, which further comprises scanning means for scanning said printing head in a direction different from said predetermined direction, and wherein said printing region is printed by said ink ejection elements to be used for printing during scanning of said printing head by said scanning means.

3. An ink jet printing apparatus as claimed in claim 2, wherein said ink ejection elements located at both end portions of said printing region are ink ejection elements at both end portions in an array of said plurality of ink ejection elements.

4. An ink jet printing apparatus as claimed in claim 1, wherein said image data is a plurality of kinds of density data, said correction means performs correction by performing matrix operation with respect to said plurality of kinds of density data, and said correction data is a coefficient for said matrix operation.

5. An ink jet printing apparatus as claimed in claim 4, wherein said coefficient for said matrix operation is obtained as a table output depending upon said plurality of kinds of density data to be corrected.

6. An ink jet printing apparatus as claimed in claim 5, wherein said plurality of kinds of density data are density data of cyan, magenta, yellow and black.

7. An ink jet printing apparatus as claimed in claim 1, wherein said correction means is one of a plurality of correction means, and further comprising a switching means for switching correction of said plurality of correction means between effective and not effective.

8. An ink jet printing apparatus as claimed in claim 7, wherein said switching means makes correction effective when the image data corresponds to the end portion of said printing region.

9. An ink jet printing apparatus as claimed in claim 8, wherein another one of said plurality of correction means performs correction for uniformly reducing the value of said image data depending upon values of said image data.

10. An ink jet printing apparatus as claimed in claim 7, wherein switching of said plurality of correction means is performed depending upon a kind of printing medium.

11. An ink jet printing apparatus as claimed in claim 1, wherein said correction means varies current correction amount depending upon a kind of printing medium.

12. An ink jet printing apparatus as claimed in claim 7, wherein the printing head has a thermal energy generating element for generating thermal energy to be utilized for ink ejection.

13. An ink jet system using a printing head having a plurality of ink ejection elements arranged in a predetermined direction and performing printing on a printing medium on a basis of image data corresponding to said plurality of ink ejection elements, said system comprising:

test pattern printing means for printing a test pattern, based on the image data corresponding to the test pattern, on the printing medium to be used for printing by using the ink ejection elements of the printing head;

reading means for reading density of the test pattern printed by said test pattern printing means so as to obtain density corresponding to each of said plurality of ink ejection elements used for printing said test pattern;

setting means for setting correction data for correcting the image data corresponding to the ink ejection elements used for printing both end portions of a printing region to be printed, on a basis of differences between the density corresponding to a first group of ink ejection elements including at least ink ejection elements at both end portions of the printing region and an average density value corresponding to a second group of ink ejection elements that excludes the first group of ink ejection elements;

correction means for correcting the image data corresponding to said ink ejection elements at both end portions on a basis of the correction data set by said setting means; and controlling means for controlling correction of the image data performed by said correction means, the image data corresponding to the test pattern, when said setting means sets the correction data corresponding to the ink ejection elements, wherein said controlling means controls said correction means based on the correction data respectively corresponding to the first group of ink ejection elements and the second group of ink ejection elements.

14. A method of correcting a density fluctuation in an image printed in an ink jet printing apparatus using a printing head having a plurality of ink ejection elements arranged in a predetermined direction and performing printing on a printing medium on a basis of image data corresponding to said plurality of ink ejection elements, said method comprising the steps of:

printing a test pattern, based on the image data corresponding to the test pattern, on the printing medium to be used for printing by using the ink ejection elements of the printing head;

reading a density of the printed test pattern so as to obtain density corresponding to each of the plurality of ink ejection elements used for printing said test pattern;

setting correction data for correcting the image data corresponding to the ink ejection elements used for printing portions including at least both end portions of a printing region to be printed, on a basis of differences between the density corresponding to a first group of ink ejection elements including at least ink ejection elements at both end portions of the printing region and an average density value corresponding to a second group of ink ejection elements that excludes the first group of ink ejection elements;

correcting the image data corresponding to said ink ejection elements at both end portions on a basis of the set correction data; and controlling correction of the image data performed in said correcting step, the image data corresponding to the test pattern, before said setting step sets the correction data corresponding to the ink ejection elements.

15. An ink jet printing apparatus using a printing head having a plurality of ink ejection elements arranged in a predetermined direction and performing printing on a printing medium on a basis of image data corresponding to said plurality of ink ejection elements, said apparatus comprising:

a first correction portion for correcting the image data corresponding to the ink ejection elements of end portions of the arranged ink ejection elements so that density indicated by said image data is decreased;

a second correction portion for correcting the image data corresponding to said ink ejection elements of said end portions on a basis of the density indicated by the image data corresponding to the plurality of ink ejection elements;

a print control portion for driving the printing head on a basis of the image data corrected by both said first correction portion and said second correction portion to perform printing; and a controlling portion for controlling correction respectively performed by said first correction portion and said second correction portion.

16. An ink jet printing apparatus as claimed in claim 15, wherein said first correction portion effects gamma correction for correcting the image data.

17. An ink jet printing apparatus as claimed in claim 15, wherein said first correction portion corrects the image data using conversion characteristics that are selectable based upon the image data.

18. An ink jet printing apparatus as claimed in claim 17, wherein the conversion characteristics are predetermined stored values.

19. An ink jet printing apparatus as claimed in claim 17, wherein the conversion characteristics comprise a family of curves whose gradients vary in correspondence with the image data.

20. An ink jet printing apparatus as claimed in claim 15, wherein said second correction portion corrects the image data using correction coefficients that are selectable based upon the image data.

21. An ink jet printing apparatus as claimed in claim 20, wherein the correction coefficients are predetermined stored values.

22. An ink jet printing apparatus as claimed in claim 20, wherein the correction coefficients comprise matrix coefficients whose magnitudes vary in correspondence with the image data.

23. An ink jet printing apparatus as claimed in claim 15, further comprising switching means for switching said first correction portion and said second correction portion between being effective and not effective.

24. An ink jet printing apparatus as claimed in claim 23, wherein switching of said first and second correction portions is performed depending upon a kind of printing medium.

25. A method of correcting a density fluctuation in an image printed in an ink jet printing apparatus using a printing head having a plurality of ink ejection elements arranged in a predetermined direction and performing printing on a printing medium on a basis of image data corresponding to said plurality of ink ejection elements, said method comprising the steps of:

correcting, in a first correction step, the image data corresponding to the ink ejection elements of end portions of the plurality of ink ejection elements so that density indicated by said image data is decreased;

correcting, in a second correction step, the image data corresponding to the ink ejection elements of the end portions on a basis of the density indicated by the image data corresponding to the plurality of ink ejection elements;

driving, in a printing step, the printing head on a basis of the image data corrected in both said first correction step and said second correction step to perform printing; and controlling correction respectively performed in said first correction step and said second correction step.

26. A method as claimed in claim 25, wherein said first correction step effects gamma correction for correcting the image data.

27. A method as claimed in claim 25, wherein said first correction step corrects the image data using conversion characteristics that are selectable based upon the image data.

28. A method as claimed in claim 27, wherein the conversion characteristics are predetermined stored values.

29. A method as claimed in claim 27, wherein the conversion characteristics comprise a family of curves whose gradients vary in correspondence with the image data.

30. A method as claimed in claim 25, wherein said second correction step corrects the image data using correction coefficients that are selectable based upon the image data.

31. A method as claimed in claim 30, wherein the correction coefficients are predetermined stored values.

32. A method as claimed in claim 30, wherein the correction coefficients comprise matrix coefficients whose magnitudes vary in correspondence with the image data.

33. A method as claimed in claim 25, further comprising a switching step for switching said first correction step and said second correction step between being executed and not executed.

34. An ink jet printing apparatus as claimed in claim 33, wherein switching of said first and second correction steps is performed depending upon a kind of printing medium.

* * * * *

UNITED STATES PATENT AND TRADEMARK OFFICE
CERTIFICATE OF CORRECTION

PATENT NO. : 6,033,137

DATED : March 7, 2000

INVENTOR(S) : ITO

It is certified that error appears in the above-identified patent and that said Letters Patent is hereby corrected as shown below:

COLUMN 1:
  Line 22, "via a" should read --via--.
  Line 24, "an" should read --a--.
  Line 32, "respective of" should read --respective heads of the--
  Line 54, "of" should be deleted.

COLUMN 2:
  Line 63, "amount" should read --amounts--.

COLUMN 6:
  Line 30, "bounderies" should read --boundaries-- and "to" should read --from--.
  Line 63, "form" should read --from--.
  Line 64, "a" should read --an--.

COLUMN 8:
  Line 3, "an" should be deleted.

COLUMN 10:
  Line 10, "with" should be deleted.

UNITED STATES PATENT AND TRADEMARK OFFICE
CERTIFICATE OF CORRECTION

PATENT NO. : 6,033,137
DATED : March 7, 2000
INVENTOR(S) : ITO

It is certified that error appears in the above-identified patent and that said Letters Patent is hereby corrected as shown below:

<u>COLUMN 11</u>:
  Line 60, "method the" should read --the method--.

<u>COLUMN 16</u>:
  Line 13, "comprising a" should read --comprising--.

Signed and Sealed this

Tenth Day of April, 2001

Attest:

NICHOLAS P. GODICI

*Attesting Officer*   Acting Director of the United States Patent and Trademark Office